United States Patent [19]

Bronstert et al.

[11] Patent Number: 4,891,410

[45] Date of Patent: Jan. 2, 1990

[54] BUTADIENE/SYTRENE BLOCK COPOLYMERS HAVING AN ASYMMETRIC STRUCTURE, THEIR PREPARATION AND THEIR USE AS MOLDING MATERIALS

[75] Inventors: Klaus Bronstert, Carlsberg; Daniel Wagner, Bad Durkheim; Horst Schuch, Ilvesheim, all of Fed. Rep. of Germany

[73] Assignee: BASF Aktiengesellschaft, Ludwigshafen, Fed. Rep. of Germany

[21] Appl. No.: 184,068

[22] Filed: Apr. 20, 1988

[30] Foreign Application Priority Data

May 2, 1987 [DE] Fed. Rep. of Germany ....... 3714711

[51] Int. Cl.$^4$ .............................................. C08F 297/04
[52] U.S. Cl. ..................................... 525/314; 525/267; 525/271
[58] Field of Search .................... 525/271, 314, 250

[56] References Cited

U.S. PATENT DOCUMENTS

| | | | |
|---|---|---|---|
| 3,231,635 | 1/1966 | Holden et al. | 525/271 |
| 3,639,517 | 2/1972 | Kitchen et al. | 525/250 |
| 3,706,817 | 12/1972 | Wald et al. | 525/314 |
| 4,080,407 | 3/1978 | Fodor | 525/314 |
| 4,335,221 | 6/1982 | Gerberding | 525/89 |

FOREIGN PATENT DOCUMENTS 0026916 4/1981 European Pat. Off.
1189767 4/1970 United Kingdom ................ 525/271

*Primary Examiner*—Wilbert J. Briggs, Sr.
*Attorney, Agent, or Firm*—Keil & Weinkauf

[57] ABSTRACT

In block copolymers of the general formula A—B—A' which have a molecular weight of less than 300,000 and consist of from 18 to 40% by weight of a vinylaromatic hydrocarbon and from 60 to 82% by weight of one or more partially or completely hydrogenated hydrocarbons and in which A and A' are each a polymer block of a vinylaromatic hydrocarbon and B is a polymer block of a diene hydrocarbon, the weight ratio of the polymer blocks A to A' is less than or equal to 1:5 and greater than 1:10 and the mean molecular weight of polymer block A is from 2,000 to 20,000 and that of the polymer block A' is from 10,000 to 110,000 and the molecular weight of the B block is not less than 18,000. The block copolymers are prepared by a process in which, in a first polymerization stage, the vinylaromatic hydrocarbon is completely polymerized to form the A or A' block, in the second polymerization stage the diene hydrocarbon is completely converted to form the B block and thereafter the second portion of the vinylaromatic hydrocarbon is polymerized on to form the A or A' block, the portion of a vinylaromatic compound for the preparation of the A' block being not less than five times, and not more than 10 times, the weight used to form the A block. The block copolymers are used for the preparation of molding materials.

9 Claims, 3 Drawing Sheets

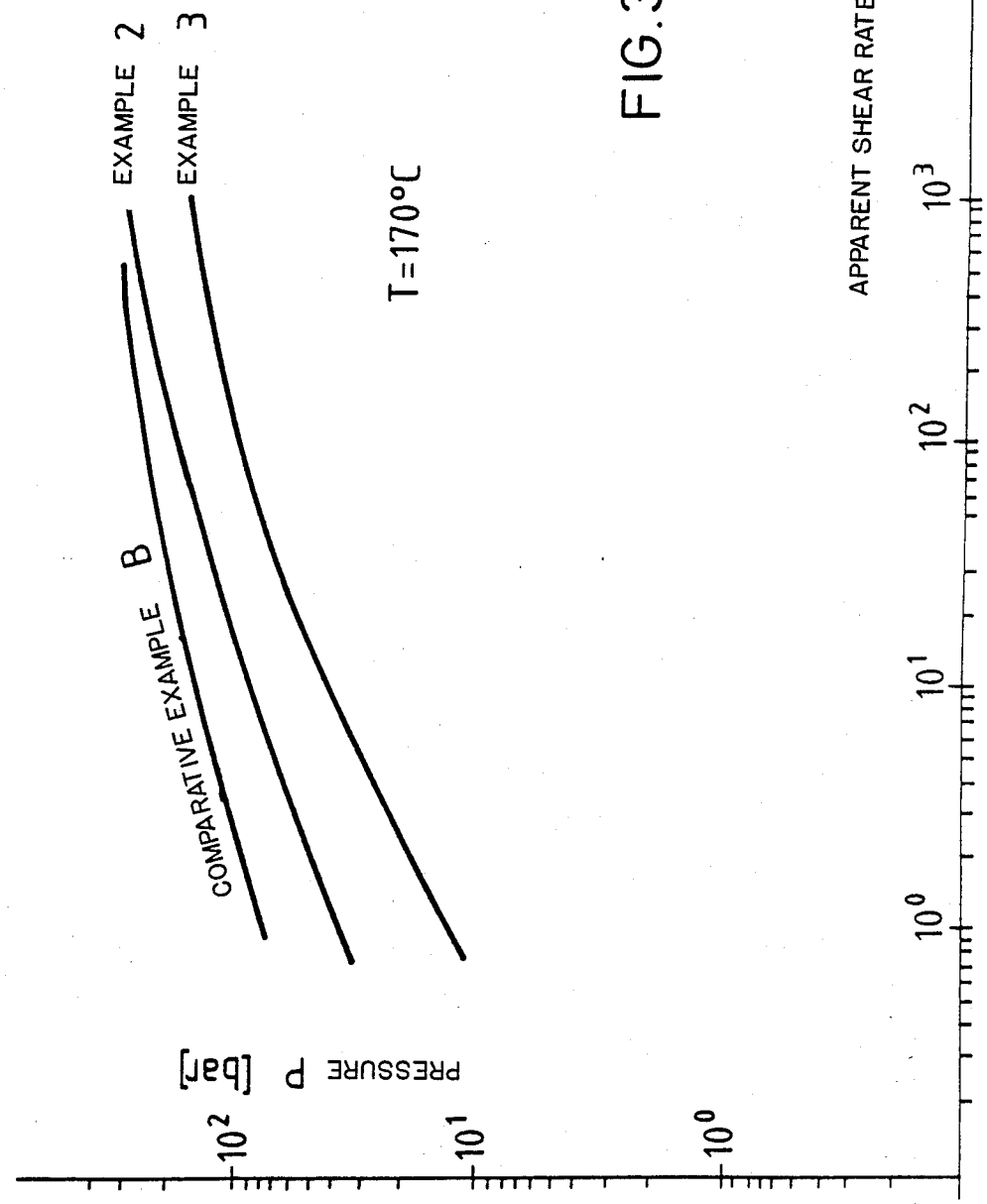

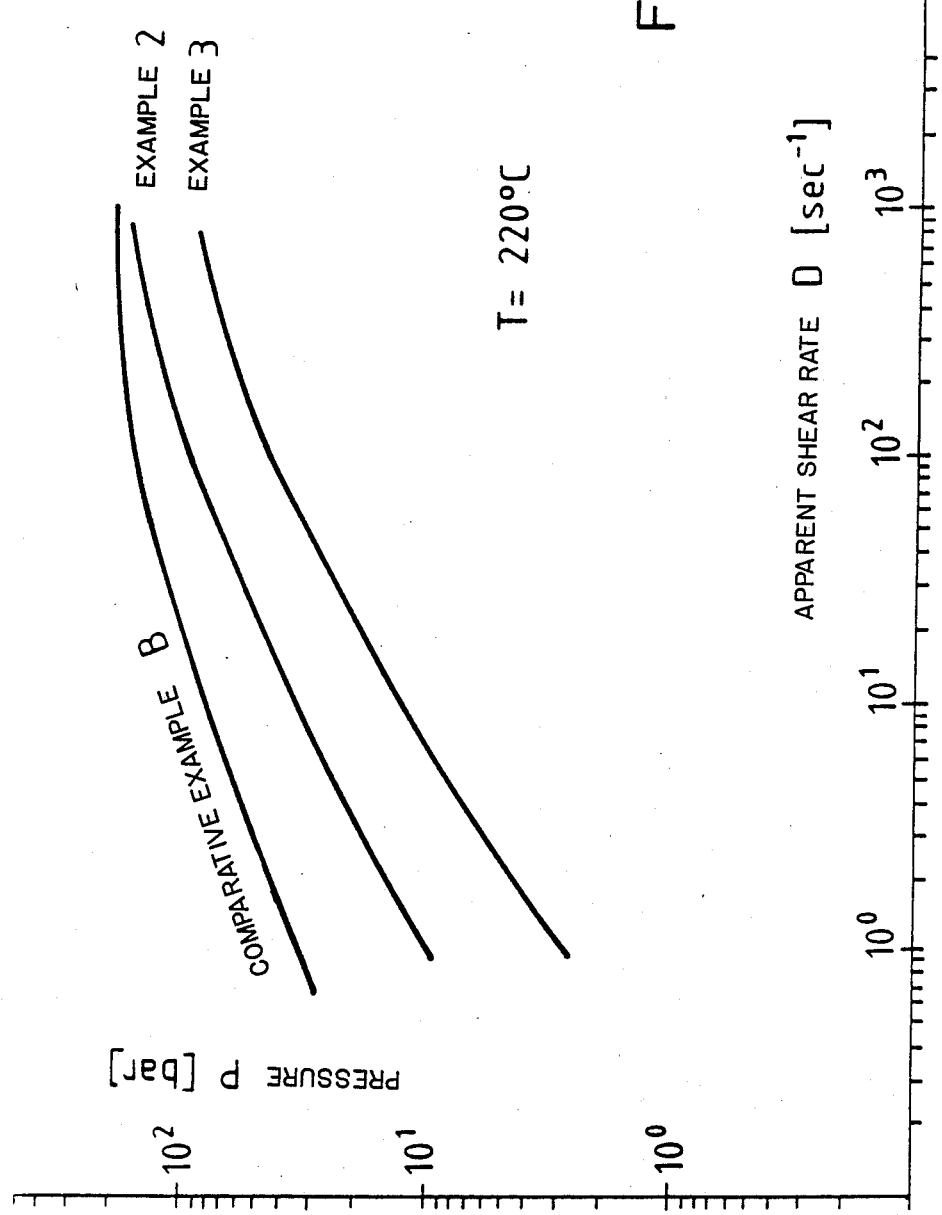

BUTADIENE/SYTRENE BLOCK COPOLYMERS HAVING AN ASYMMETRIC STRUCTURE, THEIR PREPARATION AND THEIR USE AS MOLDING MATERIALS

The present invention relates to block copolymers of the general formula A—B—A' which have a mean molecular weight of less than 300,000 and consist of from 18 to 40% by weight of a vinylaromatic hydrocarbon and from 60 to 82% by weight of one or more partially or completely hydrogenated diene hydrocarbons and in which A and A' are each a polymer block of a vinylaromatic hydrocarbon and B is a polymer block of one or more partially or completely hydrogenated diene hydrocarbons, and the preparation of these block copolymers.

Block copolymers of this type are polymeric substances which can be used for molding materials having good processibility.

It is known that block copolymers can be obtained by anionic polymerization processes from vinylaromatic hydrocarbons and conjugated dienes using organic alkali metal initiators. The varied properties of such block copolymers depend not only on the content of dienes but in particular on the content of the vinylaromatic compound. If this content is low, the block copolymers obtained are also referred to as thermoplastic elastomers. These polymers have elastomeric behaviour in the unvulcanized state and are suitable for a wide range of uses, for example for toughening styrene polymers or as components of adhesives.

Block copolymers having an asymmetric structure but a very high content of vinylaromatic component, for example 70% by weight or more, combine properties such as impact strength and transparency and are therefore used, inter alia, in the packaging sector (cf. EP-A1-00 26 916). Processes for the preparation of block copolymers having a high styrene content are described in, inter alia, U.S.-A-3 639 517.

Three-block copolymers having a symmetric structure of the general type A—B—A, in which the two terminal A blocks are thermoplastic polymer blocks which consist of a vinylaromatic hydrocarbon, eg. styrene, while the B block is composed of a selectively hydrogenated diene hydrocarbon, are described in, inter alia, U.S.-A-Re 27 145. The elastomeric middle block is formed therein by hydrogenation of a butadiene block in which from 35 to 55 mol % of the condensed butadiene units have a 1,2-configuration. Block copolymers of the polystyrene/EPDM/polystyrene structure have substantially improved stability to oxidation than those of the polystyrene/polybutadiene/polystyrene structure, opening up further fields of use for these thermoplastic elastomers. Similar three-block copolymers are also prepared from styrene and isoprene.

Because of their three-block structure, the viscosity of melts of such thermoplastic copolymers is very high and relatively sensitive to both temperature and shearing. To obtain good flow of the melt and hence uniform homogeneity of the material during processing by extrusion and injection molding, high processing temperatures and high shear fields are necessary, leading to oxidative damage to the material, particularly in the case of unhydrogenated polystyrene/polybutadiene/polystyrene three-block copolymers.

It is an object of the present invention to provide three-block copolymers which have good mechanical properties and improved processability compared with the prior art.

In the novel block copolymers, the ratio of the terminal thermoplastic blocks to the middle resilient block and the relative molecular weights of the individual blocks are matched up with one another in a certain manner in order to obtain optimum combinations of properties.

Block copolymers are known to be copolymers in which the different monomers are not incorporated randomly in the chain but homopolymeric chain segments (polymer blocks) of the different monomers are bonded to one another. In the case of the novel block copolymers having an asymmetric structure of the general formula A—B—A', the different homopolymeric chain segments A and A' of the same monomers are bonded to the different homopolymeric chain segment B of another monomer. According to the invention, the weight ratio of the polymer blocks A to A' should be less than or equal to 1:5 and greater than 1:10, in particular less than or equal to 1:6 and greater than 1:8. The weight ratio of the polymer blocks A to A' in the block copolymer can be determined by oxidative degradation of the unhydrogenated block copolymers A—B—A' with osmium tetroxide and evaluation of the gel permeation chromatograms.

In addition, the mean molecular weight of the polymer block A must be from 2,000 to 20,000, preferably from 2,500 to 4,000, and that of polymer block A' must be from 10,000 to 110,000, preferably from 15,000 to 30,000. The mean molecular weight of the polymer blocks A and A' is determined by gel permeation chromatography, as described below. The molecular weight stated is the weight average molecular weight $\overline{M}_w$.

The weight average molecular weight $\overline{M}_w$ of the block copolymer A—B—A', determined by gel permeation chromatography as described below, must be less than 300,000, preferably less than 180,000. The novel block copolymers consist of from 18 to 40, preferably from 25 to 35, % by weight of a vinylaromatic hydrocarbon and from 60 to 82, preferably from 65 to 75, % by weight of one or more partially or completely hydrogenated diene hydrocarbons. Preferred block copolymers are those having partially or completely hydrogenated diene hydrocarbons, partial hydrogenation being understood as a degree of hydrogenation of more than 50%, in particular more than 80%, and complete hydrogenation being understood as a degree of hydrogenation of more than 95%. The weight ratio of the monomers in the block copolymer can be determined by a conventional method, for example by oxidative degradation with osmium tetroxide and gravimetric analysis, IR spectroscopy or determination of the refractive index.

In the novel block copolymers, the polymer blocks A and A' may consist of vinylaromatic hydrocarbons, eg. styrene, α-methylstyrene and styrenes alkylated in the nucleus, styrene being preferred. Suitable dienes for the polymer block B are butadiene, isoprene, 2,3-dimethylbutadiene, piperylene or other anionic polymerizable conjugated $C_4$-$C_{12}$-dienes, 1,3-butadiene and isoprene being preferred.

The block copolymers of conjugated dienes and vinylaromatic hydrocarbons can be prepared by a conventional method of anionic block copolymerization by sequential addition of the monomers or by a coupling technique. Processes of this type are described in detail in, for example, U.S.-A-3 251 905, 3 390 207, 3 507 934, 3 598 887 and 4 219 627.

Suitable initiators for the polymerization are organoalkali metal compounds, preferably lithium alkyls, eg. methyllithium, ethyllithium, n-butyllithium, sec-butyllithium or isopropyllithium. n-Butyllithium or sec-butyllithium is particularly preferably used.

Advantageous solvents for the polymerization are straight-chain and branched aliphatic hydrocarbons, eg. n-octane or n-hexane, and unsubstituted or substituted cycloaliphatic and aromatic hydrocarbons, eg. cyclohexane, methylcyclohexane or toluene, as well as any mixture of the aliphatic, cycloaliphatic and aromatic hydrocarbons. Cyclohexane is an advantageous solvent.

Other suitable solvent components are ethers, such as tetrahydrofuran or diethyl ether, and tertiary amines, eg. tetramethylethylenediamine or pyridine, in concentrations of from 0.01 to 20, preferably from 0.01 to 2, % by weight.

All starting materials must be freed from oxygen and proton-active impurities, which can be effected, for example, by contact with organometallics or by adsorptive purification, for example over alumina. The polymerization is carried out under inert gas conditions at from −20° to 130° C., preferably from 25° to 80° C., under pressures at which the monomers and solvent do not vaporize at the polymerization temperature. When the polymerization is complete, an adequate amount of water, methanol or isopropanol is added to the polymerization mixture in order to deactivate the active terminal groups and excess initiator.

If necessary, the active terminal groups of the polymers may furthermore be functionalized by reaction with suitable reagents, such as ethylene oxide, ethylene sulfide or a Schiff base.

According to the invention, the procedure is as follows: in a first polymerization stage, the vinylaromatic hydrocarbon is polymerized completely to form the A or A' block, in the second polymerization step the diene hydrocarbon is completely reacted to form the B block and thereafter the second portion of the vinylaromatic hydrocarbon is polymerized on to form the A or A' block, the portion of vinylaromatic compound for the preparation of the A' block being not less than five times, and not more than 10 times, the weight used for the formation of the A block.

If necessary, the second portion of the vinylaromatic hydrocarbon may also be added as a mixture of the diene hydrocarbon in the second polymerization stage, and, as is familiar to the skilled worker, the diene hydrocarbon is first completely polymerized on and the terminal block of vinylaromatic hydrocarbon compound is bonded to the diene hydrocarbon block by a narrow transition zone in which both monomers are present.

The resulting block copolymers having an asymmetric structure can be converted by a conventional method of hydrogenation into polymers in which some or all of the aliphatic unsaturated bonds are saturated. The hydrogenation is preferably carried out using molecular hydrogen and a catalyst based on metals or metal salts of group 8 of the Periodic Table. It may be effected in the heterogeneous phase, for example using Raney nickel, or in the homogeneous phase using a catalyst based on salts, in particular carboxylates, alkoxides or enolates of cobalt, nickel or iron, which are combined with metal alkyls, in particular aluminum alkyls. Processes for the selective hydrogenation of block copolymers are described, inter alia, in the publications U.S.-A-3 113 986 and 4 226 952.

To isolate the polymer, the polymerization mixture can be alternatively heated directly to dryness or treated with steam, using a known method, the solvent being distilled off. It can also be precipitated in an excess of a non-solvent, eg. ethanol, and isolated mechanically and dried or worked up by devolatilization in an extruder. The working up procedure is not a subject of the invention.

Conventional stabilizers, reinforcing materials, fillers and various other additives can be added in a conventional manner to the block copolymers prepared by the novel process. The said block copolymers are particularly suitable as molding materials for extrusion and injection molding.

In contrast to the prevailing teaching [cf. A. Noshay and J. E. McGrath in Block Copolymers, Academic Press, New York, San Francisco, London (1977), pages 198–200], moldings of the novel block copolymers have similar mechanical properties to those known for thermoplastic elastomers having a symmetric block structure. For example, the skilled worker is familiar with the fact that the properties of thermoplastic elastomers based on microphase separation vanish if the molecular weight of the polystyrene block falls below a critical value of from 6,000 to 7,000. It is surprising that the novel block copolymer possessing a terminal styrene block which has a molecular weight of less than 5,000 combines the advantage of substantially improved processibility with the retention of good mechanical properties. The molding materials obtained from the block copolymer of the type according to the invention moreover possess particularly high transparency and improved surface gloss compared with the molding materials of the block copolymers of the known type.

The block copolymers are characterized as described below:

1. The mean molecular weights (weight average $\overline{M}_w$) were determined by gel permeation chromatography using calibration curves for polystyrene or polybutadiene (calibration substances $\overline{M}_w/\overline{M}_n$ = about 1) at 23° C. in 0.125% strength by weight tetrahydrofuran solution at a flow rate of 1.5 ml/min. In the case of block copolymers, the arithmetic weight average of the two calibration curves was used as a basis [cf. G. Glöckner, Polymercharakterisierung durch Flüssigkeitschromatographie, Verlag A. Hüthig, Heidelberg, 1982].

2. The glass transition temperatures were determined according to K. H. Illers, Kolloid-Zeitschrift, 190 (1) (1963), 16–34.

3. The block structure was characterized by oxidative degradation of the unhydrogenated block copolymers with osmium tetroxide and gel permeation chromatography.

4. The residual double bond content of the olefinically unsaturated bonds was determined by Fourier analysis of the infrared spectra.

The Examples which follow illustrate the preparation and the properties of the novel block copolymers having an asymmetric structure.

EXAMPLE 1

7,000 g of purified, anhydrous cyclohexane, 35 g of tetrahydrofuran and 150 g of styrene are initially taken under pure nitrogen in a thermostatable stirred kettle. After the proton-active impurities still present have been completely titrated with sec-butyllithium, 45 millimoles of sec-butyllithium (1.4 molar solution in cyclohexane/isopentane) are added. The temperatures of the polymerization are kept at from 45° to 65° C. for about 1 hour in order to form the first block of polystyrenelithium. Thereafter, 1,950 g of purified monomeric 1,3-butadiene are fed into the stirred kettle and polymerized at from 50° to 67° C. until complete conversion is achieved with the formation of chains of two segments of polystyrene/polybutadienyllithium. The polymerization is complete after 1 hour. A further 900 g of styrene are then added to form the third block, whose polymerization is complete after about 1 hour at 60° to 70° C. Thereafter, 15 ml of isopropanol are added to ensure termination of the living polymer chains.

After each polymerization stage, a sample is removed from the reaction vessel, for analytical purposes.

The selective hydrogenation of the block copolymer from Example 1 is carried out by adding a catalyst solution consisting of 1.4 g of nickel(II) acetylacetonate in 80 g of toluene, to which 30 ml of a 20% strength by weight solution of aluminum triisobutyl in hexane has been added, and under a hydrogen pressure of 15 bar at a hydrogenation temperature of 80° C. After 6 hours, a residual double bond content of less than 3% of the initially present olefinic unsaturation is reached. The block copolymer is worked up by removing the solvent by devolatilization in an extruder.

The A—B—A' three-block copolymer has the following structure:

| | |
|---|---|
| Molecular weight of A block | 3,500 g/mol |
| Molecular weight of A' block | 21,000 g/mol |
| Total molecular weight | 67,000 g/mol |
| Block polystyrene | 34.8% by wt. |
| Glass transition temperature | −61° C. |

EXAMPLE 2

As described in Example 1, an A—B—A' three-block copolymer is prepared using the following formulation:

| | |
|---|---|
| 7,000 g of cyclohexane | |
| 35 g of tetrahydrofuran | |
| 45 millimoles of sec-butyllithium | |
| 175 g of styrene | (monomer in the first stage - A block) |
| 1,950 g of 1,3-butadiene | (monomer in the second stage - B block) |
| 875 g of styrene | (monomer in the third stage - A' block) |

Hydrogenation and working up are carried out in the same manner as in Example 1.

The A—B—A' three-block copolymer is characterized as described below:

| | |
|---|---|
| Molecular weight of A block | 4,600 |
| Molecular weight of A' block | 23,200 |
| Total molecular weight | 75,000 |
| Block polystyrene | 34% by weight |
| Residual double bond content after hydrogenation | <3% |

EXAMPLE 3

A three-block copolymer is prepared similarly to Example 1, using the formulation below:

| | |
|---|---|
| 7,000 g of cyclohexane | |
| 35 g of tetrahydrofuran | |
| 45 millimoles of sec-butyllithium | |
| 115 g of styrene | (monomer in the first stage - A block) |
| 1,950 g of 1,3-butadiene | (monomer in the second stage - B block) |
| 935 g of styrene | (monomer in the third stage - A' block) |

The A—B—A' three-block copolymer is characterized as described below:

| | |
|---|---|
| Molecular weight of A block | 2,600 |
| Molecular weight of A' block | 22,000 |
| Total molecular weight | 72,000 |
| Block polystyrene | 34.6% by weight |
| Residual double bond content | <3% (after hydrogenation according to Example 1) |

COMPARATIVE EXAMPLE A

For comparison, an A—B—A' three-block copolymer, but one which has a symmetric structure, is prepared similarly to the preceding Example 1.

| Formulation | |
|---|---|
| 7,000 g of cyclohexane | |
| 35 g of tetrahydrofuran | |
| (45 millimoles of sec-butyllithium) | |
| 525 g of styrene | (monomer in the first stage - A block) |
| 1,950 g of 1,3-butadiene | (monomer in the second stage - B block) |
| 525 g of styrene | (monomer in the third stage - A' block |

Hydrogenation and working up are carried out in the same way as in Example 1.

The A—B—A' three block copolymer is characterized as described below:

| | |
|---|---|
| Molecular weight of A block | 12,000 g/mol |
| Molecular weight of A' block | 11,500 g/mol |
| Total molecular weight | 68,000 g/mol |
| Block polystyrene | 34% by weight |
| Glass transition temperature | −58° C. |
| Residual double bond content after hydrogenation | <3% |

COMPARATIVE EXAMPLE B

For comparison, an A—B—A' three-block copolymer is prepared similarly to the preceding Examples:

| Formulation | |
|---|---|
| 7,000 g of cyclohexane | |
| 35 g of tetrahydrofuran | |
| 45 millimoles of sec-butyllithium | |
| 300 g of styrene | (monomer in the first stage - A block) |
| 1,950 g of 1,3-butadiene | (monomer in the second stage - B block) |
| 750 g of styrene | (monomer in the third stage - A' block) |
| Characterization | |
| Molecular weight of A block | 6,800 |

-continued

| | |
|---|---|
| Molecular weight of A' block | 17,000 |
| Total molecular weight | 69,000 |
| Block polystyrene | 34% by weight |
| Glass transition temperature | −58° C. |
| Residual double bond content after hydrogenation | <3% |

To prepare samples for testing the mechanical properties, the resulting granules from Example 1 and Comparative Example A are injection molded to give stepped plates. The block copolymer according to the invention can be very easily removed from the mold at 240° C. (injection molding temperature). The moldings of the block copolymer according to the invention have a completely satisfactory appearance, high surface gloss and transparency.

In order to obtain moldings of the block copolymer prepared for comparison purposes, the injection molding temperature must be increased by 20° C. Molded samples of this polymer have dull surfaces and virtually no transparency.

The results of the tests carried out with regard to the mechanical properties of the molded samples are listed below:

Mechanical testing of block copolymers
(Tensile test according to DIN 53,504 on S2 standard bars
Test speed: 250 mm/min
Test temperature: 23° C.

| | | Example 1 | Comparative Example A |
|---|---|---|---|
| Tensile strength | [N/mm$^2$] | 8.72 | 17.47 |
| Elongation at break | [%] | 570 | 574 |
| Modulus at 300% | [N/mm$^2$] | 4.10 | 2.68 |

To prepare samples for testing the mechanical properties, the three-block copolymers according to Examples 2 and 3 and Comparative Example B are pressed to give sheets (T=160° C.; 3 minutes prepressing under 5 bar; 2 minutes pressing under 200 bar; 3 minutes cooling to room temperature under 200 bar).

The results of the tests carried out with regard to the mechanical properties (according to DIN 53,504 on S2 bars) are listed below:

| | | Example 2 | Example 3 | Comparative Example B |
|---|---|---|---|---|
| Tensile strength | [N/mm$^2$] | 21.3 | 9.63 | 25.75 |
| Elongation at break | [%] | 463 | 475 | 498 |

The improved processibility of the novel block copolymers in comparison with the prior art is also evident from the melt viscosities, as can be seen from the measurements described below.

BRIEF DESCRIPTION OF THE DRAWINGS

Graphs are set forth in the drawings which illustrate certain properties of the present copolymer and compare those properties to the properties of copolymers having a symmetric structure.

The flow properties of the different, hydrogenated A—B—A' three-block copolymers were measured in a nitrogen capillary viscometer (capillary dimensions: L/R=18, 09).

For further illustration, FIG. 3 and FIG. 4 show the pressure/throughput characteristics for melts of the block copolymers according to Examples 2 and 3 and Comparative Example B. The pressure p [bar] (ordinate) is plotted against the apparent shear rate D [sec$^{-1}$] (abscissa), D being calculated from the mass throughput.

Figure 1:
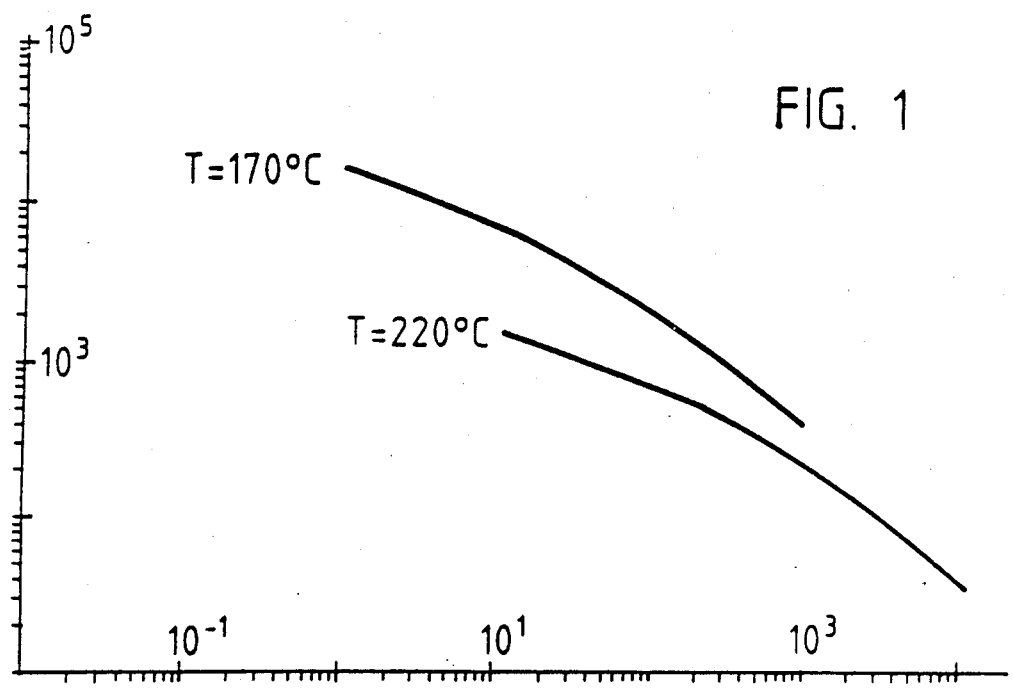
In FIG. 1, the apparent viscosity ETA [Pa.s] is plotted as the ordinate against the apparent shear rate D [sec$^{-1}$] (abscissa) for melts of the block copolymer (Example 1) at T=170° C. and T=220° C.
Figure 2:
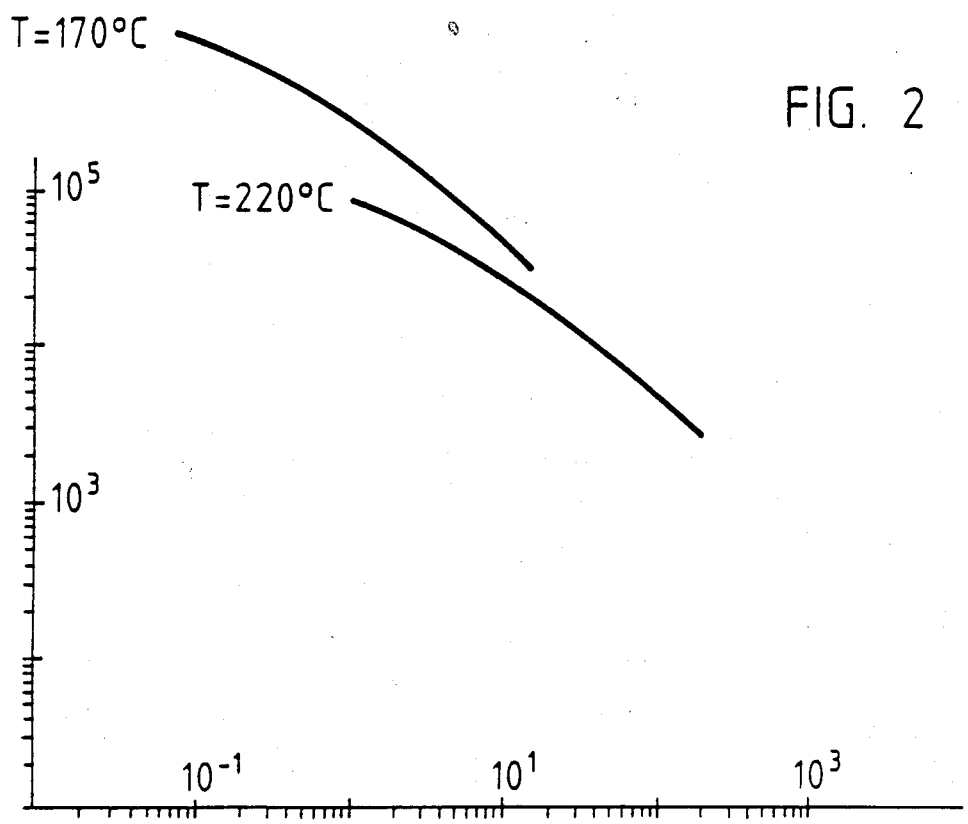
In FIG. 2, the same plot has been chosen for melts of the block copolymer (Comparative Example A) at T=170° C. and T=220° C.

We claim:

1. A block copolymer of the formula A—B—A' which has a mean molecular weight of less than 300,000 and consists of from 18 to 40% by weight of a vinylaromatic hydrocarbon and from 60 to 82% by weight of one or more partially or completely hydrogenated diene hydrocarbons, wherein A and A' are each a polymer block of a styrene monomer selected from styrene and styrenes alkylated in the nucleus and B is a polymer block of one or more partially or completely hydrogenated diene hydrocarbons, and wherein the weight ratio of the polymer blocks A to A' is less than or equal to 1:5 and greater than 1:10, the mean molecular weight of the polymer block A is from 2,000 to 20,000, that of the polymer block A' is from 10,000 to 110,000 and that of the polymer block B is not less than 18,000.

2. The block copolymer of claim 1, wherein the mean molecular weight of the polymer block A is from 2,500 to 4,000 and that of the polymer block A' is from 15,000 to 30,000.

3. A molding material having good processibility and obtained from a block copolymer as claimed in claim 1.

4. The block copolymer of claim 1, wherein the weight ratio of polymer blocks A to A' is less than or equal to 1:6 and greater than 1:8.

5. The block copolymer of claim 4, wherein the vinylaromatic hydrocarbon content is from 25 to 35% by weight and the partially or completely hydrogenated diene hydrocarbon content is from 65 to 75% by weight.

6. A block copolymer of the formula A—B—A' comprising by weight:
    (a) 18 to 40% of a vinylaromatic hydrocarbon, and
    (b) 60 to 82% of one or more hydrogenated diene hydrocarbons, wherein:
    (i) A and A' are polymer blocks of vinyl aromatic hydrocarbons,
    (ii) B is a polymer block of a hydrogenated diene hydrocarbon that has a degree of hydrogenation of more than 50%,
    (iii) the weight ratio of the A/A' polymer blocks is less than or equal to 1/5 and greater than 1/10, and
    (iv) polymer block A has a mean molecular weight from 2,000 to 20,000, polymer block A' has a mean molecular weight from 10,000 to 110,000, and polymer block B has a mean molecular weight not less than 18,000.

7. The block copolymer of claim 6, wherein the vinylaromatic hydrocarbon is selected from the group comprising styrene, α-methylstyrene and styrenes alkylated in the nucleus, and wherein the mean molecular weight of polymer blocks A and A' are from 2,500 to 4,000 and from 15,000 to 30,000 respectively.

8. The block copolymer of claim 6, wherein the weight ratio of polymer blocks A to A' is less than or equal to 1/6 and greater than ⅛.

9. The block copolymer of claim 6, wherein the vinylaromatic hydrocarbon content is from 25 to 35% by weight and the hydrogenated diene hydrocarbon content is from 65 to 75% by weight.

* * * * *